Dec. 29, 1970    J. B. GRIFFO    3,550,426

FLUID METER FIELD CHECKING METHOD AND APPARATUS

Filed March 18, 1969

INVENTOR.
JOSEPH B. GRIFFO

BY
Brumbaugh, Graves, Donohue & Raymond
his   ATTORNEYS.

United States Patent Office

3,550,426
Patented Dec. 29, 1970

3,550,426
FLUID METER FIELD CHECKING METHOD AND APPARATUS
Joseph B. Griffo, Woodstock, N.Y., assignor to Rotron Incorporated, Woodstock, N.Y., a corporation of New York
Filed Mar. 18, 1969, Ser. No. 808,103
Int. Cl. G01f 25/00
U.S. Cl. 73—3
7 Claims

ABSTRACT OF THE DISCLOSURE

A method and apparatus for checking a fluid flow meter of the split flow type under actual operating conditions in the field are described. A pair of differential pressure measurements are taken across the meter chamber, one in each of the flow paths. These values are employed, in conjunction with the meter proof factor to compute directly the deviation of the meter from its originally calibrated response. The meter need not be disconnected for checking purposes nor is knowledge of fluid density required. Particular pressure measuring devices and a computing circuit for providing direct readings of meter deviation are disclosed.

BACKGROUND OF THE INVENTION

The present invention relates to meters for measurement of the flow of fluids, and more particularly to a method and means for checking the accuracy of such meters while operating in the field.

Proper control of the delivery of the fluids, such as in fuel delivery and in chemical processing plants, requires that the metering devices employed to indicate the volume delivered be periodically checked for accuracy. Such meters are subject to wear, malfunctioning due to dirt, etc., and rough handling and often require recalibration to restore their accuracy. Heretofore, the checking of such meters required either disconnection of the meter from its operating system and removal to a laboratory for recalibrating, or interrupting the fluid flow system in which the meter was connected and establishing a standard set of conditions of flow, against which the meter could be checked. In either case, interference with the normal operation of the system served by the meter, was required. Furthermore, such techniques did not provide for continuous monitoring of the meter operation which, as will be apparent, provides the best procedure for detecting meter malfunction.

U.S. Pat. No. 2,906,121 to Knauth, assigned to the present assignee, discloses a type of flow meter that has come into wide use in recent years. Such a flow meter employs what is termed the vortex principle to provide an accurate indication of the volumetric flow of fluid therethrough. Specifically, the flow channel of the meter is provided with an interior chamber, approximately semicylindrical in shape and partially offset from the main channel, which generates a vortex flow alongside of the main stream. Mounted in the chamber and arranged to be rotated by the vortex flow is a wheel or cage of the so-called squirrel-cage type which responds to the vortex flow and revolves with it. The vortex wheel assists in maintaining the vortex flow and also provides a means for producing an output indication of the flow rate through the meter, the rate of rotation of the wheel bearing a linear relation to the velocity of flow along the flow path. The cross-sectional area of the flow path being known and remaining constant, the meter may be calibrated in volumetric units, e.g., gallons or cubic feet. A direct reading indicator may be mechanically or magnetically coupled to the rotor cage to provide a visible indication.

In Pat. No. 3,091,118 to Hubbard, also assigned to the present assignee, there is shown an improved form of vortex flow meter in which the main flow path through the meter is divided by a septum. One of the flow paths through the meter, relatively small in cross-sectional area as compared to the main flow path, serves as a calibration channel in which calibration means are inserted. The latter comprises simply a plug whose degree of protrusion into the calibration channel may be adjusted, such as by a wrench or screwdriver. This, in effect, changes the total cross-section of the flow meter and thus varies the number of revolutions of the rotor cage in the main flow channel representing a volumetric unit of fluid flow.

The present invention has for its principal objection, the provision of a method and means for checking the accuracy of a flow meter of the split flow type under actual field conditions, without disconnecting the meter or interrupting operation of the system in which it is interposed.

SUMMARY OF THE INVENTION

The principles of the invention are realized by taking a pair of differential pressure measurements in each channel of a split flow meter, the differential pressure in the principal flow path taken across the meter structure and in the calibration channel, across the calibration structure. These readings are then employed in a specific relationship to compute a result indicative of the percent of deviation of actual meter response from its factory calibration. Should the deviation exceed a predetermined range of tolerances, appropriate recalibration or repairs, if necessary, may be made.

To obtain the required pressure measurements, each path of the flow meter is provided with a pair of pressure taps respectively up and downstream of the meter chamber. A transducer which converts pressure into electrical resistance values is coupled between each pair of pressure taps to provide an electrical parameter related to the differential pressures. These resistances are employed in a Wheatstone bridge circuit to compute directly the percentage deviation.

The foregoing will be more readily understood from the following detailed description of the invention, taken in conjunction with the accompanying drawings.

DETAILED DESCRIPTION OF THE INVENTION

Figure 1:
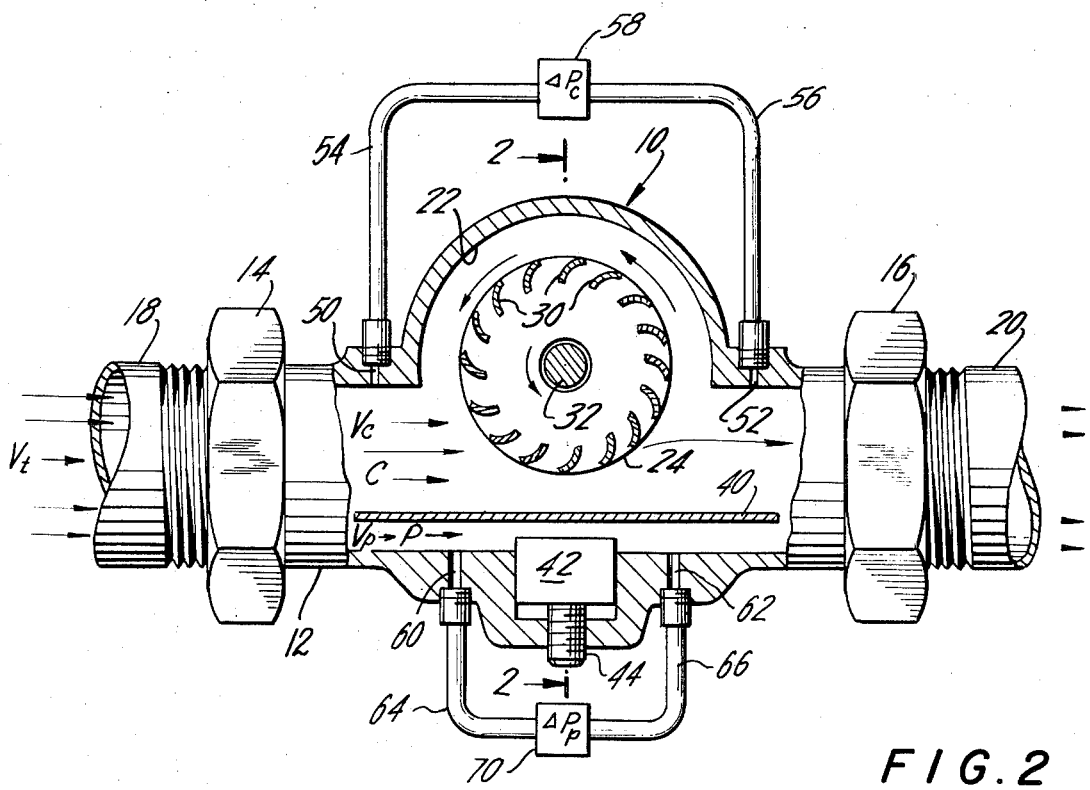
FIG. 1 is a partial longitudinal cross-section through a vortex meter of the split flow type showing the pressure measuring structure.
Figure 2:
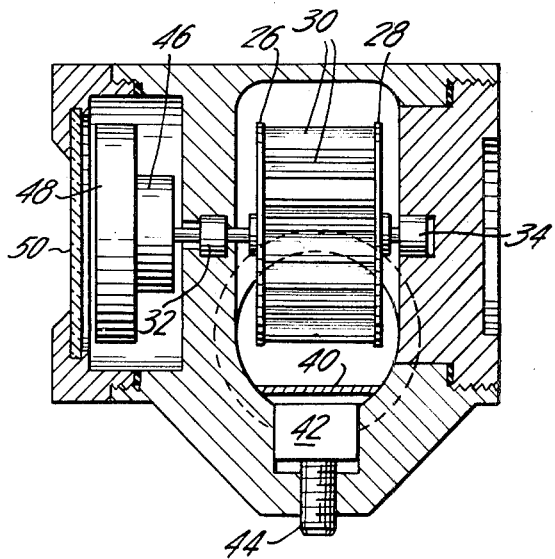
FIG. 2 is a transverse cross section through the meter chamber of FIG. 1 along the lines 2—2.

Referring now to FIGS. 1 and 2, the outer housing for the flow meter is indicated generally at 10. The flow channel through the meter is defined by the pipelike section 12 which is provided with threaded couplers 14 and 16 at either end for connection to the pipe sections 18 and 20 constituting the fluid line in which the meter is interposed.

Communicating with the flow path 12 of the meter is the offset chamber 22 whose cross section in the direction of flow of fluid is approximately semicircular. The offset chamber provides a housing for the rotor cage 24 which is comprised of a pair of circular end members 26 and 28 (FIG. 2) between which are mounted a plurality of vanes 30, which may be curved (as shown) or flat. The rotor is journaled in bearings 32, 34 supported in the opposite sidewalls of the offset chamber.

The flow channel 12 through the meter is divided by means of a flat metallic sheet or septum 40 into an upper or principal flow channel C and a lower or calibration channel P. Adjustably mounted in the bottom wall of the meter is a calibration plug 42 which can be variably positioned in the calibration channel P by means of the threaded member 44.

As seen in FIG. 2, the rotor cage 24 is coupled through the bearing 32 to a readout mechanism for counting and indicating the number of revolutions of the cage. The coupling member 46 may be a mechanical linkage, such as a gear train, as shown in the above mentioned Pat. No. 2,906,121, or a magnetic coupling which converts the rotation of the cage to electrical signals. The indicator 48 driven by the coupling means 46 may be of any suitable type providing a visual reading viewable through the transparent window 50. Where an electrical output signal is provided, the indicator may be in the form of an electrical meter, a chart recorder, magnetic tape, etc.

In operation, the fluid in the principal flow path of the meter sets up a vortex flow pattern in the chamber 22 as a result of the chamber geometry. The rotor cage 24, by virtue of its position, is set into rotation by the vortex at a rate of revolution that is linearly related to the velocity of fluid flow through the meter. The indicator 48 thus may be directly calibrated in volumetric flow, since the cross-sectional area of the meter is fixed and known.

As will be seen, the position of the plug 42 in the calibration channel varies its effective cross-sectional area and thus the overall cross-sectional area of the flow channel through the meter. This has the effect of increasing or decreasing the velocity of the fluid flow through the meter for a given volume input and thereby permits adjustment of the meter readout system. That is, the number of revolutions of the rotor cage 24 will be greater per volumetric unit of fluid passing through the meter when the cross-sectional area is reduced, and vice versa.

A pair of pressure taps 50, 52 are provided in the principal flow path of the meter, one on either side of the rotor cage 24. Conduits 54 and 56 couple the fluid pressures present thereat to a differential pressure measuring device 58 which produces an output indicative of the pressure drop in the principal channel across the rotor cage 24.

A similar pair of pressure taps 60 and 62 are located one on either side of the calibration plug 42 in the calibration channel P. The pressures thereat are coupled through conduits 64, 66, respectively, to another differential pressure measuring device 70. The latter indicates the pressure drop across the calibrating plug 42.

The inventor has discovered that by measuring the two differential pressures across the meter structure and combining them with a characteristic constant of the particular meter in accordance with a prescribed relationship, a figure representative of the deviation of the meter response from its factory calibrated response may be readily obtained while the meter is operating in the field under actual flow conditions.

Returning to FIG. 1, the septum 40 splits the input fluid velocity $V_t$ into two components, $V_c$ in the principal channel and $V_p$ in the calibration channel of the meter.

In the principal channel, the pressure drop $\Delta P_c$ across the rotor cage may be expressed as:

$$\Delta P_c = K_c \rho_c V_c^2$$

where $K_c$ is a constant
$\rho_c$ is the density of the fluid in the principal channel upstream of the rotor
$V_c$ is the fluid velocity in the principal channel upstream of the rotor.

Similarly, the pressure drop $\Delta P_p$ across the calibration plug may be expressed as:

$$\Delta P_p = K_p \rho_p V_p^2$$

where
$K_p$ is a constant
$\rho_p$ is the density of the fluid in the calibration channel upstream of the calibration plug
$V_p$ is the fluid velocity in the principal channel upstream of the calibration plug.

By transposing and rearranging terms, the ratio $v_r$ of velocities in the two channels may be stated as:

$$v_r = \frac{V_c}{V_p} = \sqrt{\frac{\Delta_c K_p \rho_p}{\Delta_p K_c \rho_c}}$$

Since for all practical purposes, the densities of the fluids in the two meter channels will be the same, even for a compressible fluid such as a gas, the density terms will cancel. Consolidating the constants into a single new constant $K_f$, the velocity ratio $v_r$ may be written as:

$$v_r = K_f \sqrt{\frac{\Delta P_c}{\Delta P_p}} \qquad (1)$$

As noted above, the vortex meter described is characterized by a linear relationship between the angular velocity $w$ of the vortex wheel and the velocity of the fluid into the meter, $V_t$. Thus, $$\frac{w}{V_t} = K_t$$

Similarly, the angular velocity $w$ of the cage is linearly related to the velocity of the fluid in the principal channel and $$\frac{w}{V_c} = K_o$$

Therefore, $$w = V_t K_t = V_c K_o$$

and $$V_t = V_c \frac{K_o}{K_t} = V_c K_s \qquad (2)$$

Ignoring compressibility of the fluid within the meter and slight area changes, we can say that:

$$A_t V_t = A_c V_c + A_p V_p$$

where $A_t$, $A_c$ and $A_p$ are the cross-sectional areas of the meter input, the principal channel and the calibration channel, respectively. Dividing by $A_t$ and lumping constants, this can be written as:

$$V_t = K_1 V_c + K_2 V_p$$

Substituting for $V_t$ (from Equation 2 and transposing:

$$K_s V_c - K_1 V_c = K_2 V_p$$

$$V_c (K_s - K_1) = K_2 V_p$$

$$\frac{V_c}{V_p} = \frac{K_2}{(K_s - K_1)} \qquad (3)$$

It is seen from Equation 3 that the velocity ratio $v_r$ is a constant, which we will call $K_r$.

The foregoing demonstrates that for a meter whose number of revolutions per volume unit of fluid throughput in constant, its velocity ratio $v_r$ and square root of the ratio of the differential pressures is constant, regardless of fluid density, since from Equation 1:

$$v_r = K_r = K_f \sqrt{\frac{\Delta P_c}{\Delta P_p}} \qquad (4)$$

Having established this relationship, let it be assumed that the meter in question is operating such that its revolutions/volume unit as transmitted through the coupling 46 produces a precisely accurate reading on the indicator. Let it also be assumed for convenience, that the velocity ratio is adjusted to be unity, ie., $V_c = V_p$, and that these conditions represent zero percent deviation from the desired operation. Then:

$$(K_r - 1) 100 = \text{percent deviation} = E \qquad (5)$$

or by substitution for $K_r$ $$E(\text{percent}) = \left(K_f \sqrt{\frac{\Delta P_c}{\Delta P_p}} - 1\right) 100 \qquad (6)$$

The constant $K_f$, which may be termed the proof factor for the meter, is determined at the factory before the meter is installed in the field in the following manner. Fluid under known volume rate of flow and pressure is supplied to the meter input and the deviation $E$ of the observed meter revolutions/volume unit from its theoretical design figure is calculated. The pressures $\Delta P_c$ and and $\Delta P_p$ are also observed. This is repeated for a significant number of volume and pressure conditions and each set of such conditions, the factor $K_f$ computed from the formula:

$$K_f = \left(\frac{E}{100} + 1\right) \sqrt{\frac{\Delta P_p}{\Delta P_c}} \qquad (7)$$

which is the deviation formula of Equation 6 solved for the proof factor.

If an acceptable range of deviation is regarded to be no more than ±1%, all of the computed proof factors derived under conditions where $E$ was in that range then are averaged to arrive at the proof factor $K_f$ for that particular meter.

Each flow meter will have its proof factor $K_f$ thus predetermined before installation in the field and by combining $K_f$ with the differential pressures measured under field conditions as described above, the meter deviation may be obtained.

Figure 3:
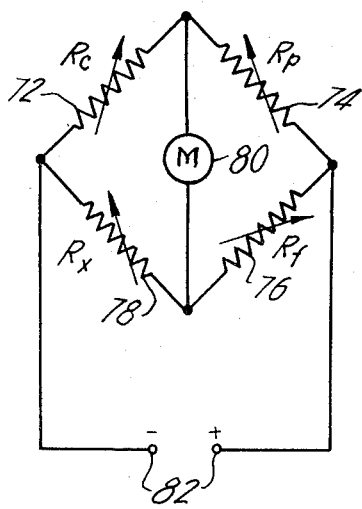
FIG. 3 is a schematic diagram of the Wheatstone bridge circuit for computing the percent of deviation.

Computation of the deviation $E$ may be performed by mental calculation of the operator, or automatically with the circuit of FIG. 3.

In FIG. 3, variable resistances 72, 74, 76 and 78 are connected as shown in a well known Wheatstone bridge circuit, with a current meter 80 connected between the common terminals of resistances 72, 74 and 76, 78. A source of D.C. voltage, such as a battery, is connected between the terminals 82.

The resistances 72, 74 may be provided directly by employing pressure measuring devices 58, 70 of the type that convert pressure values into resistance values. Such devices come in various forms but generally comprise a pressure responsive element such as a bellows, which moves a contact along a resistance element as it contracts and expands with varying pressure. Appropriate terminals are brought out of the transducer to enable it to be connected into an external circuit as a variable resistance. By appropriate design of the resistance element in the transducer, its pressure-resistance response may be linear, exponential, etc. A line of such transducers is manufactured by Computer Instruments Corporation.

Using a transducer having an appropriate exponential response characteristic the resistances 72, 74 may be proportional to the square root of the differential pressures $\Delta P_c$ and $\Delta P_p$, respectively, or

114

$$R_c = k_1 \sqrt{\Delta P_c}$$

$$R_p = k_2 \sqrt{\Delta P_p}$$

From the Wheatstone bridge relationships and the above, it is known that:

$$\frac{R_c}{R_p} = \frac{R_x}{R_s} = \frac{k_1}{k_2} \sqrt{\frac{\Delta P_c}{\Delta P_p}} = k_3 \sqrt{\frac{\Delta P_c}{\Delta P_p}}$$

But we know also that $$K_r = K_f \sqrt{\frac{\Delta P_c}{\Delta P_p}} \qquad (4)$$

or $$\frac{K_r}{K_f} = \sqrt{\frac{\Delta P_c}{\Delta P_p}}$$

Therefore, $$\frac{R_c}{R_p} = \frac{R_x}{R_s} = \frac{k_3 K_r}{K_f}$$

Since $K_f$ is fixed and known for the meter, $R_s$ can be set to be proportional to $K_f$. Consequently, $R_x$ becomes directly proportional to $K_r$.

It will be seen then, that if $R_x$ (resistance 78) is varied to balance the bridge (i.e., reduce the current through the meter to zero), its value at balance is proportional to $K_r$ which in turn is related to the deviation $E$ by the formula:

$$E(\text{percent}) = (K_r - 1)100$$

and a simple calibration chart can give the value of $E$ from the indicated $R_x$.

Alternatively, $R_x$ could be left constant at the zero deviation value and the meter 80 calibrated to read directly in percent deviation $E$, since the current through the meter will be proportional to $K_r$.

It will be seen from the foregoing, that the field measured deviation obtained as explained above will quickly apprise the observer of the relationship between the meter reading and actual fluid delivery. If the flow meter is not reading accurately, within its prescribed limits, the calibration plug may be adjusted until the deviation is sufficiently reduced. All of the measurement and adjustment may be performed without disconnecting the meter or otherwise disturbing the operation of the system which it serves. Furthermore, since the mathematical relationship employed by the described method and apparatus does not depend on fluid density, it is of particular advantage in gas or mixed gas liquid flow systems wherein variable densities may be expected to occur.

The deviation $E$ may be continuously monitored if desired, or measurements may be made at periodic intervals. The pressure sensing devices 58, 70 and their associated conduits and fittings may be readily removable by providing check valves in each of the taps on the meter housing which are opened when the fittings are attached. Likewise, the computing circuit may be portable along with the pressure apparatus to provide a completely mobile system.

Although the invention has been described in connection with a velocity meter of the vortex type, it is to be understood that the principles are applicable to other forms of flow measuring equipment, such as orifice meters, of the split flow type, i.e., having main or measuring flow and calibration channels.

I claim:

1. A method of checking the accuracy of a flow meter of the split flow type during use, said flow meter having a principal flow path in which measurement means are disposed and a parallel calibration flow path in which calibration means for adjusting the response of said measurement means are disposed, comprising the steps of measuring the pressure drop across the measurement means in said principal flow path during actual flow conditions, measuring the pressure drop across the calibration means in said calibration channel during actual flow conditions, computing the deviation of the flow meter measurement from a predetermined standard according to the relationship:

$$E = \left(K_f \sqrt{\frac{\Delta P_c}{\Delta P_p}} - 1\right) 100$$

where $E$ is the deviation (in percent)
$\Delta P_c$ is the pressure drop across the measurement means,
$\Delta P_p$ is the pressure drop across the calibration means, and $K_f$ is a constant representing operation of the flow meter under controlled input condition, and providing an indication of the deviation.

2. The method of claim 1 wherein said measuring, computing and indicating are performed simultaneously and continuously during the existence of actual flow conditions to provide a continuous record of deviation.

3. The method according to claim 1 wherein said constant $K_f$ for the flow meter is derived by the steps of applying to the input of the meter a fluid of fixed density under controlled pressure and rate of flow, varying in discrete steps both the pressure and rate of flow, for each combination of pressure and rate of flow measuring the pressure drops across the measuring and calibration means respectively, and the deviation of the actual flow rate from the indicated flow rate, calculating for each set of such measurements the value of the constant $K_f$ according to the relationship:

$$K_f = \left(\frac{E}{100} + 1\right)\sqrt{\frac{\Delta P_D}{\Delta P_c}}$$

and averaging the $K_f$ values derived from deviations falling within an acceptable range.

4. In a flow meter of the vortex velocity type wherein the flow path through the meter is split into a principal channel and a calibration channel, said meter including measurement means responsive to the velocity of fluid flow in said principal channel to indicate the volume of fluid flow along the flow path and calibration means in said calibration channel for adjusting the response of said measurement means, means for checking the accuracy of said flow meter against a predetermined standard while in use comprising, a pair of pressure taps in said principal channel respectively up and downstream of said measurement means, a pair of pressure taps in said calibration channel respectively up and downstream of said calibration means, differential pressure measuring means coupled between said pair of pressure taps in the principal channel for providing a first pressure measurement representative of the pressure difference across said flow measurement means, differential pressure measuring means coupled between said pair of pressure taps in the calibration channel for providing a second pressure measurement representative of the pressure difference across said calibration means, and computing means responsive to said first and second pressure measurements for producing an output indicative of the percent deviation E of the flow meter operation from its predetermined standard according to the relationship $$E = \left(K_f\sqrt{\frac{\Delta P_c}{\Delta P_D}} - 1\right)100$$

where $\Delta P_c$ is said first pressure measurement, $\Delta P_D$ is said second pressure measurement, and $K_f$ is a constant representing operation of the flow meter under controlled input conditions.

5. Apparatus according to claim 4 wherein said differential pressure measuring means comprises resistance means whose resistance value is variable with the differential pressure.

6. Apparatus according to claim 5 wherein said resistance value varies as the square root of the differential pressure.

7. Apparatus according to claim 6 wherein said computing means comprises a Wheatstone bridge circuit, two arms of which include respective resistance values of said differential pressure measuring means.

References Cited
UNITED STATES PATENTS

| | | | |
|---|---|---|---|
| 1,146,377 | 7/1915 | Walpole | 73—205 |
| 2,906,121 | 9/1959 | Knauth | 73—229 |
| 3,091,118 | 5/1963 | Hubbard | 73—230 |
| 3,452,596 | 7/1969 | Griffo | 73—3X |

LOUIS R. PRINCE, Primary Examiner

W. A. HENRY II, Assistant Examiner

U.S. Cl. X.R.

73—230